(12) United States Patent
Kim

(10) Patent No.: US 7,395,101 B2
(45) Date of Patent: Jul. 1, 2008

(54) PORTABLE COMMUNICATION DEVICE

(75) Inventor: Young S. Kim, Palo Alto, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 11/265,819

(22) Filed: Nov. 3, 2005

(65) Prior Publication Data

US 2006/0154706 A1 Jul. 13, 2006

(30) Foreign Application Priority Data

Jan. 11, 2005 (KR) .................. 10-2005-0002517

(51) Int. Cl.
*H04M 1/00* (2006.01)
(52) U.S. Cl. ............ 455/575.3; 455/556.1; 455/90.3; 379/433.13
(58) Field of Classification Search ......... 455/575.1, 455/575.4, 90.3, 575.3, 556.1; 379/433.1
See application file for complete search history.

(56) References Cited

U.S. PATENT DOCUMENTS 6,865,406 B2 * 3/2005 Park .................. 455/575.3
7,050,764 B2 * 5/2006 Carlson ................ 455/90.3
2004/0132482 A1 * 7/2004 Kang et al. ............ 455/550.1
2004/0203535 A1 * 10/2004 Kim et al. ............. 455/90.3

FOREIGN PATENT DOCUMENTS

KR 1020040103036 12/2004

* cited by examiner

*Primary Examiner*—Rafael Perez-Gutierrez
*Assistant Examiner*—Amancio Gonzalez
(74) *Attorney, Agent, or Firm*—The Farrell Law Firm, PC

(57) ABSTRACT

A portable communication device is disclosed. The portable communication device includes a body housing; a rotatable auxiliary housing which continuously maintains a state in which the auxiliary housing is received so as to be parallel to a bottom surface of the body housing, the auxiliary housing being opposite to the bottom surface of the body housing; and a rotation/swing housing engaged with the body housing and rotated about a first hinge axis so as to rotate away from the body housing and to be swung about a second hinge axis perpendicular to the first hinge axis.

6 Claims, 6 Drawing Sheets

PORTABLE COMMUNICATION DEVICE

PRIORITY

This application claims priority to an application entitled "PORTABLE COMMUNICATION DEVICE" filed with the Korean Intellectual Property Office on Jan. 11, 2005 and assigned Serial No. 2005-2517, the contents of which are incorporated herein by reference.

BACKGROUND OF THE INVENTION

1. Field of the Invention

The present invention relates to portable communication devices including cellular phones, PDAs (Personal Digital Assistants), HHPs (Hand Held Phones), camera phones, game phones, Internet phones, and message phones.

2. Description of the Related Art

In general, the term "portable communication device" refers to an electronic device that a user can carry to perform wireless communication with a desired partner. To facilitate portability, designs of such portable communication devices tend not only to be compact, slim, and light, but are also moving toward providing multimedia availability, having a wider variety of functions. In particular, future portable communication devices are expected to incorporate greater multi-functionality and be capable of multi-purpose utilization, as well as being more compact, light, and capable of being modified to be suitable for various multimedia or Internet environments. Additionally, portable communication devices are now commonly used by people of all ages and all walks of life throughout the world, and are recognized by some people as a nearly indispensable commodity which should be carried all the time.

Portable communication devices may be classified into various categories according to their appearance, such as a bar-type portable communication device, a flip-type portable communication device, and a folder-type portable communication device. A bar-type portable communication device refers to a device having a single housing of a bar-shape. A flip-type portable communication device refers to a device in which a flip is rotatably mounted to a housing by a hinge unit. A folder-type communication device refers to manner in which a folder is rotatably connected to a single bar-type housing by a hinge unit.

Portable communication devices may also be classified into a necklace type portable communication device and a wrist or bracelet type portable communication device according to the position or the way in which users put on the portable communication devices. The necklace type portable communication device refers to a portable manner in which a terminal is worn around a neck of a user using a string. Further, the bracelet type portable communication device refers to a portable manner in which a terminal is worn around a wrist of a user.

In addition, portable communication devices may be classified into a rotation-type portable communication device and a slide-type communication device according to the manner of opening and closing the portable communication device. The rotation-type portable communication device refers to a manner in which two housings are rotatably connected, opposed to each other. The slide-type communication device refers to a manner in which two housings are slid with respect to each other in the lengthwise direction of the device. These variously classified portable communication devices can be easily understood by those skilled in the art.

Meanwhile, conventional portable communication devices now tend to transmit data at a high speed in addition to performing the basic voice communication function. In other words, according to the increase in consumer demand, portable communication devices now tend to provide a service using a wireless communication technology capable of transmitting data at high speed.

Recent portable communication devices also tend to be equipped with a camera lens to obtain video signals for transmission. In other words, current portable communication devices have an external or embedded camera lens module which enables users to perform video communication with desired partners or to photograph desired subjects.

However, according to the conventional portable communication device, since the camera lens is generally fixably mounted to the body, a user cannot photograph a subject conveniently. Especially, since the camera lens employed in the conventional portable device is always exposed, it cannot be protected from the exterior environment. Further, since the camera lens of the conventional portable device cannot be rotated, there is a problem in photographing moving images.

SUMMARY OF THE INVENTION

Accordingly, the present invention has been made to solve the above-mentioned problems occurring in the prior art, and an object of the present invention is to provide a portable communication device capable of photographing a subject conveniently.

Another object of the present invention is to provide a portable communication device in which a camera lens is disposed so as to be rotated in parallel to the body housing in order to protect the camera lens and expose the camera lens when used, thereby enabling the portable communication device to be used conveniently.

Another object of the present invention is to provide a portable communication device in which a camera lens thereof can be rotated by 360 degrees, thereby facilitating photographing moving images.

In order to accomplish these objects, there is provided a portable communication device including a body housing; a rotatable auxiliary housing, continuously maintaining a state in which the auxiliary housing is received so as to be parallel to a bottom surface of the body housing, the auxiliary housing being opposite to the bottom surface of the body housing; and a rotation/swing housing engaged with the body housing and rotated about a first hinge axis so as to be away from the body housing and capable of swinging about a second hinge axis perpendicular to the first hinge axis.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. In the following description of the present invention, a detailed description of known functions and configurations incorporated herein is omitted to avoid making the subject matter of the present invention unclear.

Figure 1:
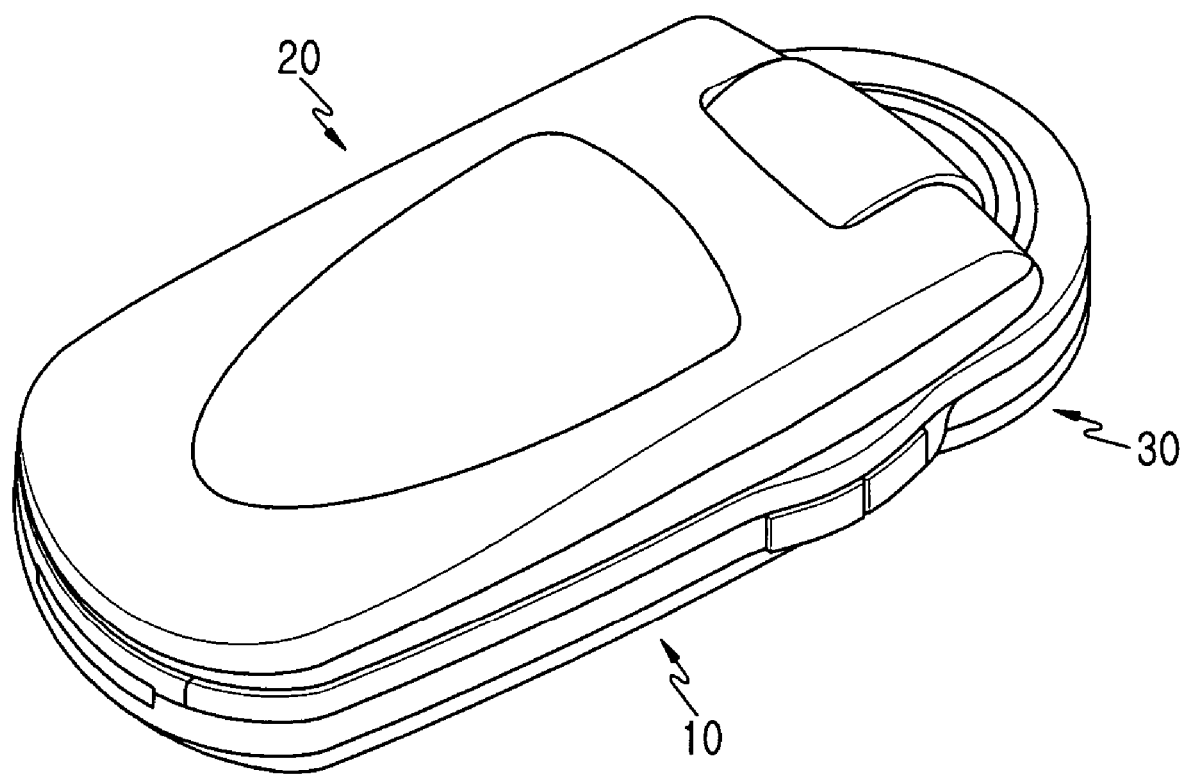
FIG. 1 is a perspective view showing the upper portion of a portable communication device according to a preferred embodiment of the present invention.
Figure 2:
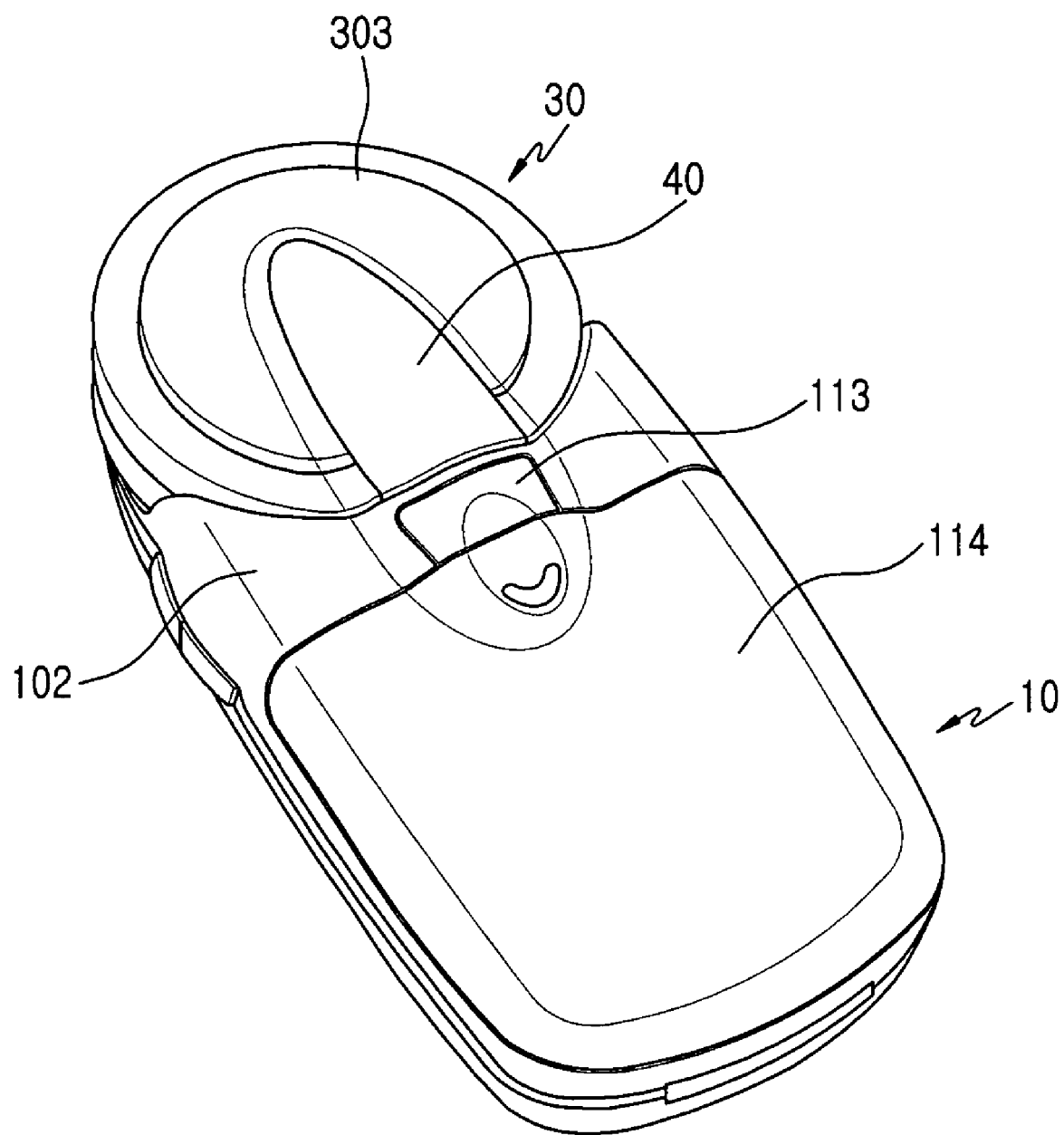
FIG. 2 is a perspective view showing the bottom portion of a portable communication device according to a preferred embodiment of the present invention.
Figure 3:
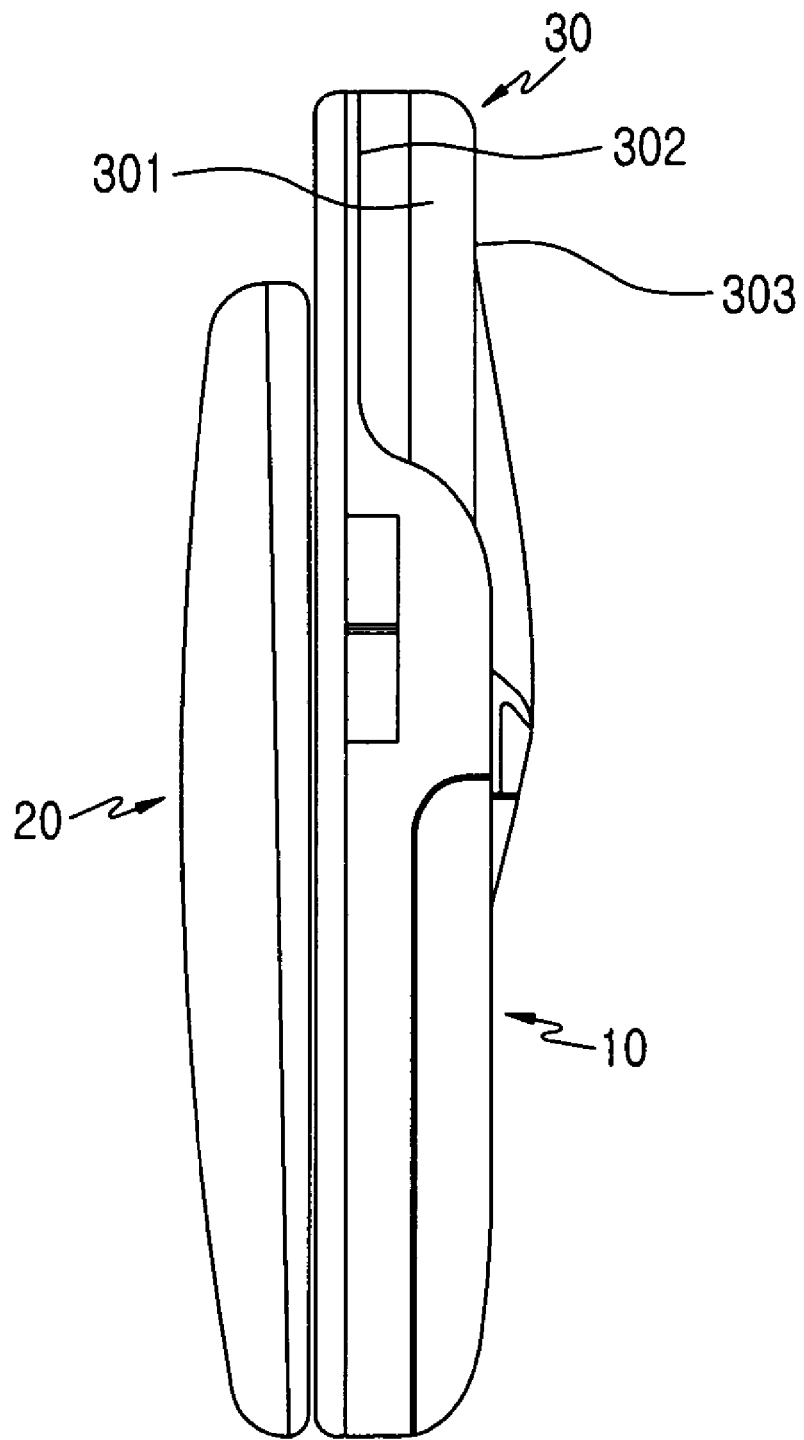
FIG. 3 is a side view of the portable communication device of FIG. 1.
Figure 4:
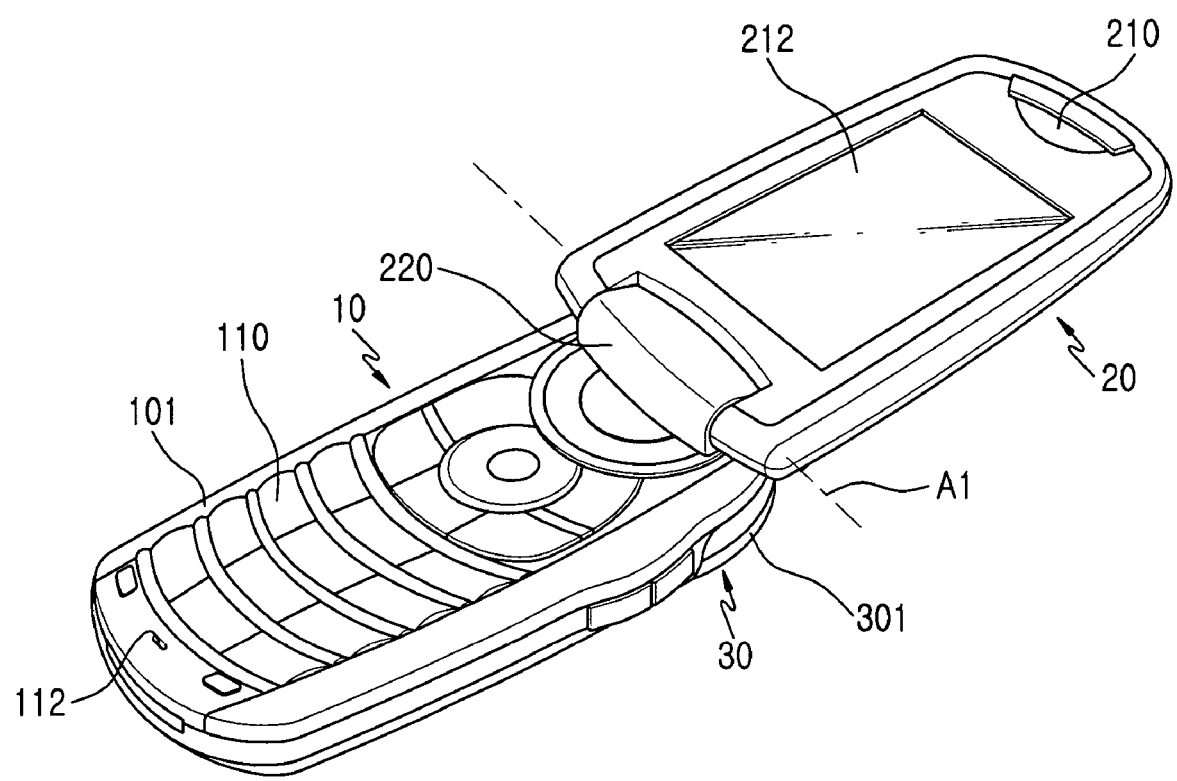
FIG. 4 is a perspective view showing a state in which a swing housing of a portable communication device according to a preferred embodiment of the present invention is opened about a first hinge axis.
Figure 5:
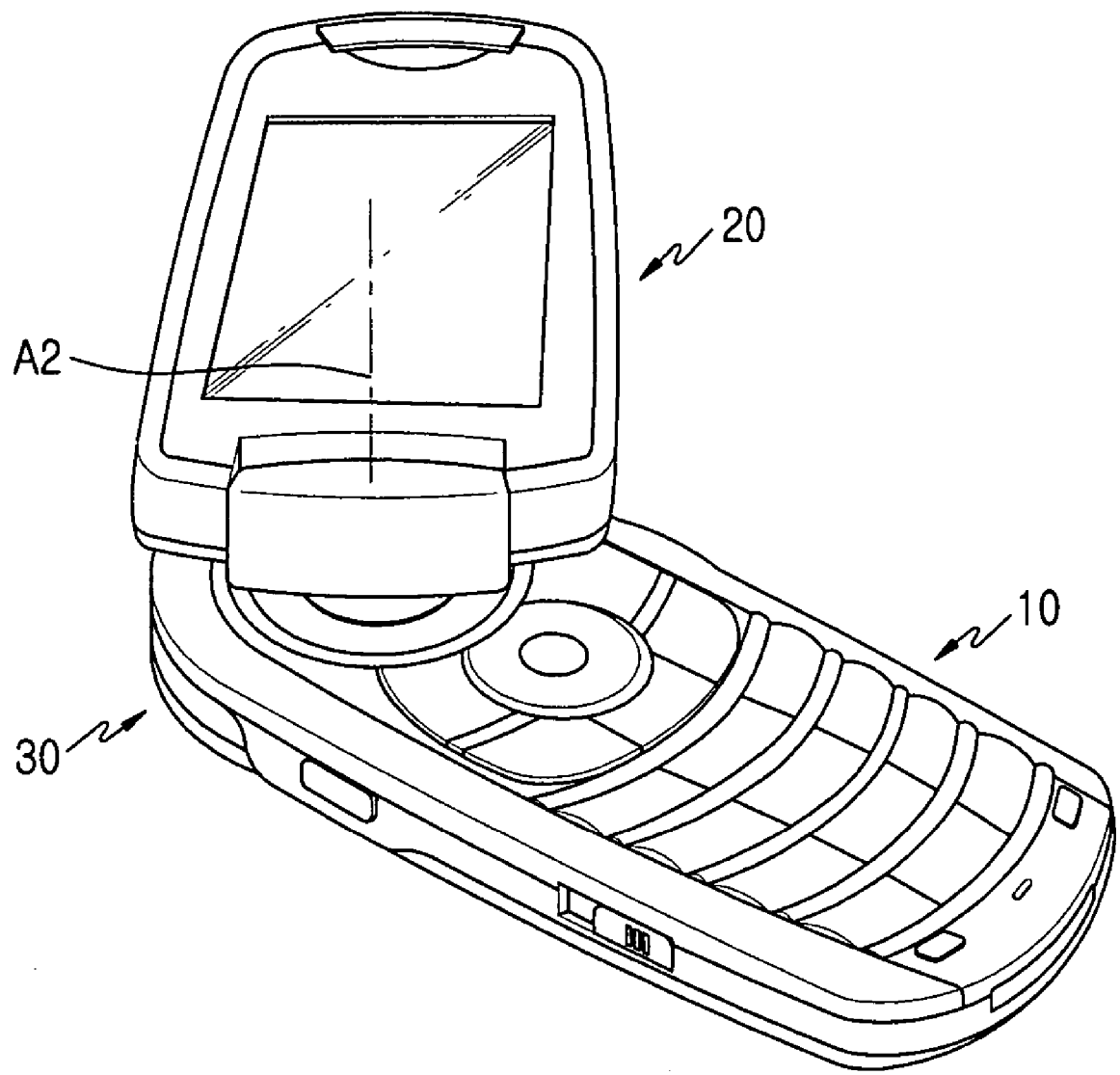
FIG. 5 is a perspective view showing a state in which a swing housing of a portable communication device according to a preferred embodiment of the present invention is rotated about a second hinge axis.

As shown in FIGS. 1 to 3, a portable communication device according to the present invention includes a bar-type body housing 10, a rotatable auxiliary housing 30, continuously maintaining a state in which the auxiliary housing 30 is received so as to be parallel to the bottom surface 102 of the body housing 10, and a rotation/swing housing 20 engaged with the body housing 10 and rotated or swung about a first or second hinge axis A1 or A2, as shown in FIGS. 4 and 5. According to the portable communication device according to the present invention, the auxiliary housing 30 is connected integrally on the bottom surface of the body housing 10, and the rotation/swing housing 20 is connected to the body housing 10 so as to be rotated or swung by a hinge arm 220.

Figure 6:
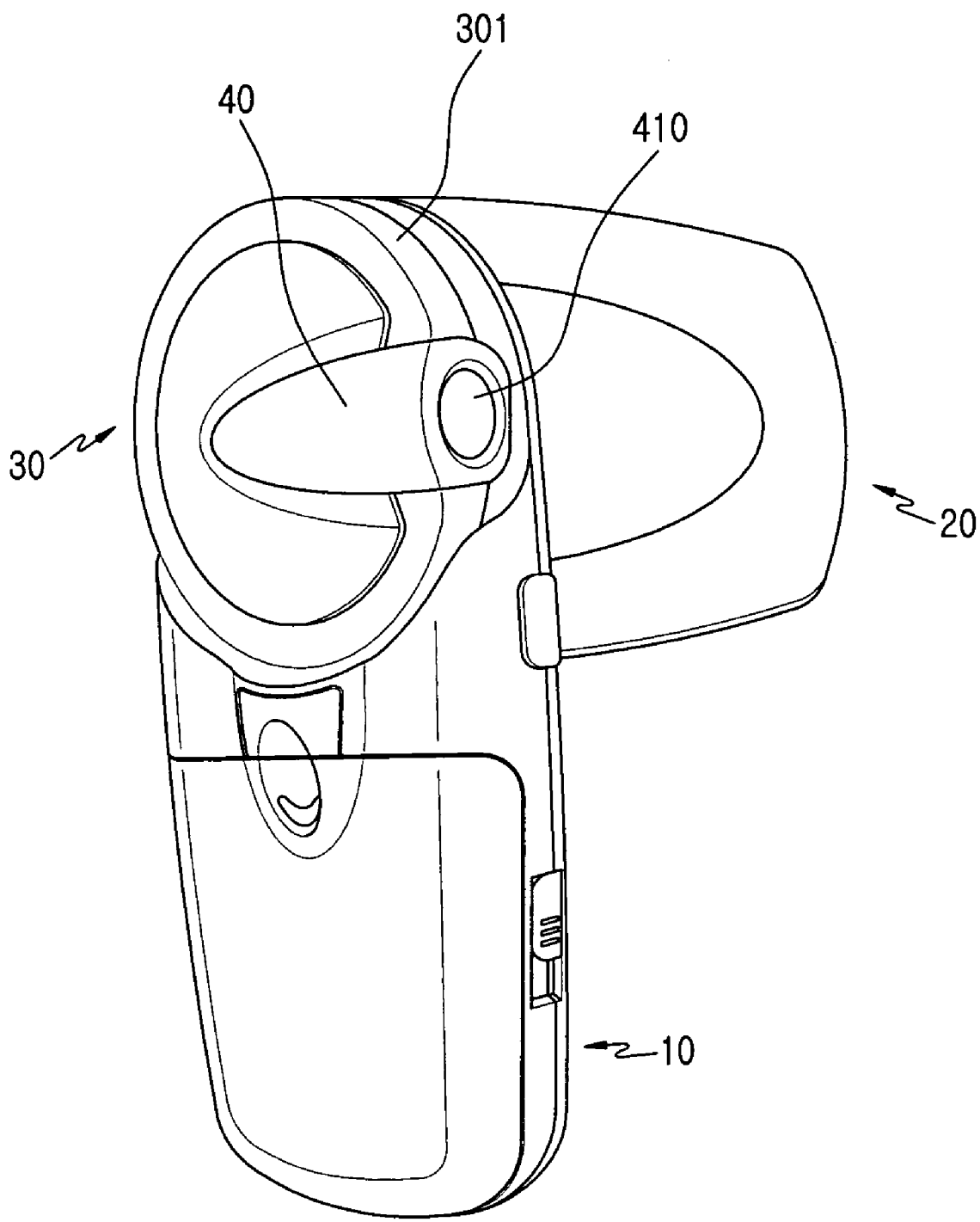
FIG. 6 is a perspective view showing a portable communication device in a camera mode according to a preferred embodiment of the present invention.

The auxiliary housing 30 has a cylindrical shape, and includes a camera lens housing 40. A portion of the circumferential surface 301 of the camera lens housing 40 is concealed by the body housing 10, and the remaining portion of the circumferential surface 301 thereof is exposed from the body housing 10. Further, the upper surface 302 of the auxiliary housing 30 is concealed by the body housing 10, and the bottom surface 303 thereof is always exposed. As seen in FIG. 6, a camera lens 410 of the camera lens housing 40 is mounted onto the circumferential surface 301 of the auxiliary housing 30 so as to be exposed, and is protected by the body housing 10 or exposed when the rotation/swing housing 20, and auxiliary housing 30, rotate as shown in FIG. 6.

Preferably, the hinge axes of the rotation/swing housing 20 and the auxiliary housing 30 are the same. However, in other embodiments, the hinge axes of the rotation/swing housing 20 and the auxiliary housing 30 may not be the same. The rotation/swing housing 20 is connected to the body housing 10 by the hinge arm 220.

As shown in FIGS. 2 and 4, a plurality of first keys 110 and a microphone unit 112 are disposed on the upper surface 101 of the body housing 10, and a battery pack 114 and a locking knob 113 for attaching and detaching the battery pack 114 are disposed on the bottom surface 102 thereof. Further, a speaker unit 210 and a display unit 212 are disposed on the bottom surface of the rotation/swing housing 20.

As shown in FIGS. 4-6, if after the rotation/swing housing 20 is opened by about ninety degrees about the hinge axis A1 from the body housing 10, the auxiliary housing 30 is rotated by about ninety degrees about the second hinge axis A2, a user can photograph a subject by using the camera lens 410, while looking at the display unit 212.

According to the present invention, since the rotation/swing housing can be rotated by 360 degrees and the camera lens is protected when. the portable communication device is not used, a user can photograph a subject in a camera mode and the camera lens is protected from the exterior environment when the portable communication device is not used.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A portable communication device comprising:
a body housing;
an auxiliary housing which continuously maintains a state in which the auxiliary housing is received so as to be parallel to a bottom surface of the body housing, the auxiliary housing being opposite to the bottom surface of the body housing, the auxiliary housing being rotatable about an auxiliary axis perpendicular to the bottom surface of the body housing;
a camera lens housing being provided in the auxiliary housing and receiving a camera lens, the camera lens being protected by the body housing, and the camera lens being exposed when the auxiliary housing rotates about the auxiliary axis; and
a rotation/swing housing rotatable about a first hinge axis perpendicular to the auxiliary axis, the rotation/swing housing being engaged with the body housing so as to be opened with respect to the body housing, and rotatable about the auxiliary axis.

2. A portable communication device according to claim 1, wherein the auxiliary housing has a cylindrical shape, and an upper surface of the auxiliary housing is always opposite to the bottom surface of the body housing.

3. A portable communication device according to claim 1, wherein a portion of a circumferential surface of the auxiliary housing is concealed by the body housing, a remaining portion of the circumferential surface thereof is exposed, an upper surface of the auxiliary housing is always concealed by the body housing, and a bottom surface of the auxiliary housing is always exposed.

4. A portable communication device according to claim 1, wherein the camera lens is exposed on a circumferential surface of the auxiliary housing, and is protected by the body housing and is exposed when the rotation/swing housing and auxiliary housing rotate.

5. A portable communication device according to claim 1, wherein the auxiliary housing is rotated by 360 degrees about the auxiliary axis.

6. A portable communication device according to claim 1, wherein a plurality of first keys and a microphone unit are disposed on an upper surface of the body housing, a battery pack is disposed on the bottom surface of the body housing, a speaker unit and a display unit are disposed on a bottom surface of the rotation/swing housing, and the auxiliary housing is adjacent to the battery pack.

* * * * *